United States Patent
Wang et al.

(10) Patent No.: US 11,028,484 B2
(45) Date of Patent: Jun. 8, 2021

(54) ELECTROLESS NICKEL PLATING OF SILICONE RUBBER

(71) Applicant: Agency for Science, Technology and Research, Singapore (SG)

(72) Inventors: Shengqin Wang, Singapore (SG); Yew Wei Leong, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 129 days.

(21) Appl. No.: 16/345,684

(22) PCT Filed: Oct. 30, 2017

(86) PCT No.: PCT/SG2017/050543
§ 371 (c)(1),
(2) Date: Apr. 26, 2019

(87) PCT Pub. No.: WO2018/084804
PCT Pub. Date: May 11, 2018

(65) Prior Publication Data
US 2019/0352779 A1   Nov. 21, 2019

(30) Foreign Application Priority Data
Nov. 3, 2016   (SG) .............................. 10201609215P

(51) Int. Cl.
*C23C 18/32* (2006.01)
*C08K 3/013* (2018.01)
(Continued)

(52) U.S. Cl.
CPC .............. *C23C 18/32* (2013.01); *C08K 3/013* (2018.01); *C08K 5/05* (2013.01); *C08K 5/17* (2013.01);
(Continued)

(58) Field of Classification Search
CPC . C23C 18/32; C23C 18/1216; C23C 18/1893; C08K 5/05; C08K 5/17
See application file for complete search history.

(56) References Cited

U.S. PATENT DOCUMENTS 6,734,250 B2 * 5/2004 Azechi .................... C08K 3/08
252/511
6,861,097 B1    3/2005 Goosey et al.
(Continued)

FOREIGN PATENT DOCUMENTS

CN    101122016 A    2/2008
EP      0134825 A1    3/1985

OTHER PUBLICATIONS

Written Opinion of the International Searching Authority for International Application No. PCT/SG2017/050543 dated Jan. 18, 2018, pp. 1-5.
(Continued)

*Primary Examiner* — Nathan T Leong
(74) *Attorney, Agent, or Firm* — Winstead PC

(57) ABSTRACT

According to the present disclosure, a method for coating nickel on an organosiloxane polymer wherein the said method comprises the steps of; forming a transition metal oxide on the organosiloxane polymer; etching the transition metal oxide with a basic solution; contacting the organosiloxane polymer comprising the etched transition metal oxide with an aqueous solution comprising a positively charged species to attach the positively charged species on the etched transition metal oxide; depositing a metal catalyst on the positively charged species; and treating the metal catalyst with an acidic solution to develop an activated organosiloxane polymer before transferring the activated organosiloxane polymer to a solution comprising nickel and/or nickel derivatives. A nickel organosiloxane composite is provided herein comprising a transition metal oxide layer and a positively charged species attached on the said oxide layer with nickel coated in the said positively charged species.

14 Claims, 3 Drawing Sheets

(51) Int. Cl.
| | |
|---|---|
| C08K 5/05 | (2006.01) |
| C08K 5/17 | (2006.01) |
| C08L 83/04 | (2006.01) |
| C23C 18/12 | (2006.01) |
| C23C 18/16 | (2006.01) |
| C23C 18/18 | (2006.01) |
| C23C 18/20 | (2006.01) |
| C23C 18/28 | (2006.01) |
| C23C 18/30 | (2006.01) |
| H01B 1/22 | (2006.01) |
| C08K 3/22 | (2006.01) |

(52) U.S. Cl.
CPC .......... *C08L 83/04* (2013.01); *C23C 18/1216* (2013.01); *C23C 18/1653* (2013.01); *C23C 18/1893* (2013.01); *C23C 18/208* (2013.01); *C23C 18/285* (2013.01); *C23C 18/30* (2013.01); *H01B 1/22* (2013.01); *C08K 2003/2241* (2013.01)

(56) References Cited

U.S. PATENT DOCUMENTS

| | | |
|---|---|---|
| 2012/0094035 A1 | 4/2012 | Chen et al. |
| 2012/0192758 A1 | 8/2012 | Imori et al. |
| 2014/0120255 A1* | 5/2014 | Lee .................... C23C 18/2086 427/214 |

OTHER PUBLICATIONS

International Search Report for International Application No. PCT/SG2017/050543 dated Jan. 18, 2018, pp. 1-5.
Domenech et al., "Electroless Plating of Nickel-Phosphorous on Surface-Modified Poly(ethylene terephthalate) Films," Applied Surface Science, vol. 220, 2003, pp. 238-250.
Wang Ke, "Development of Lead-Free Electroless Nickel Plating Systems and Metal Thin Films on Silicone and Nafion Membranes," Thesis, Department of Chemical and Biomolecular Engineering, National University of Singapore, 2008, pp. 1-219.
Gray et al., "High-Conductivity Elastomeric Electronics," Advanced Materials, vol. 16, No. 5, Mar. 5, 2004, pp. 393-397.
Yan et al., "Electroless Nickel Deposition on Silicone-Rich Polyester Surfaces," Journal of The Electrochemical Society, vol. 151, No. 11, 2004, C685-C693.
Lacour et al., "Stretchable Interconnects for Elastic Electronic Surfaces," Proceedings of the IEEE, vol. 93, No. 8, Aug. 2005, pp. 1459-1467.
Lim et al., "Reliable Fabrication Method of Transferable Micron Scale Metal Pattern for Poly(dimethylsiloxane) Metallization," Lab Chip, vol. 6, 2006, pp. 578-580.
Dupas-Bruzek et al., "Pt Metallization of Laser Transformed Medical Grade Silicone Rubber: Last Step Toward a Miniaturized Nerve Electrode Fabrication Process," Journal of Applied Physics, vol. 106, 074913, 2009, pp. 1-5.
Latifi et al., "Plasma Surface Oxidation of 316L Stainless Steel for Improving Adhesion Strength of Silicone Rubber Coating to Metal Substrate," Applied Surface Science, vol. 320, 2014, pp. 471-481.

* cited by examiner

ELECTROLESS NICKEL PLATING OF SILICONE RUBBER

CROSS-REFERENCE TO RELATED APPLICATION

This application claims the benefit of priority of Singapore Patent Application No. 10201609215P, filed 3 Nov. 2016, the content of it being hereby incorporated by reference in its entirety for all purposes.

TECHNICAL FIELD

The present disclosure relates to a method for coating nickel on an organosiloxane polymer. The present disclosure also relates to a nickel organosiloxane polymer composite.

BACKGROUND

Silicone rubber is an elastomer composed of organosiloxane polymers such that they contain organic and inorganic moieties. Due to the Si—O bond and inorganic properties, silicone rubber tends to be superior over ordinary organic rubbers in terms of flexibility, heat resistance and chemical stability. Consequently, silicone rubber has been used widely in many areas including electronic, automotive and biomedical industries.

The metallization of silicone rubber, i.e. the deposition of thin metallic film on its surface, is of great interest in the industries. Metallized silicone rubber is a very useful material because it combines merits of the metallic surface with those of silicone rubber, such as softness, flexibility, stretchability, moldability, chemical and heat resistance. Potential applications may therefore include those that require electrical or thermal conductivity, electromagnetic interference (EMI) shielding, actuation, sensing or even corrosion protection. For example, metallized silicone rubbers may be used in interconnectors of flexible electronics, in smart sealing components and/or functionalized microfluidic devices.

The metallization of silicone rubber, however, is extremely difficult because silicone rubber has very low surface energy and lacks reactive sites.

Conventionally, two types of methods have been reported for metalizing silicone rubber. One is physical in nature while the other is chemical in nature.

The physical method relies on metal vapour deposition and may include e-beam assisted deposition, plasma assisted deposition, chemical and physical vapour deposition etc. Such physical methods, however, likely require high vacuum and tend to be difficult for industry adoption due to expensive equipments needed. Meanwhile, chemical methods may exploit reduction of metal ions to deposit metal on the polymer, e.g. in aqueous solution. Such chemical methods may be known as "electroless metal plating". Examples so far include coating silicone rubber with noble metals such as platinum (Pt) and gold (Au) via electroless plating, and in such examples, the silicone rubber surface is first activated by ultraviolet (UV) laser and $H_2PtCl_6$ solution, followed by coating with the noble metal salt solution that may be highly reactive. Although such chemical methods have been extensively utilized due to their energy efficiency, expensive specialized equipments and rare materials render such chemical methods economically unfeasible.

Conventionally, electroless nickel plating has been specifically applied on silicone-rich polyester surface but not on neat organosiloxane polymers (e.g. neat silicone rubber surface) due to inertness and low surface energy of the latter. The term "neat" means that a material is solely made of a single material. For example, a neat silicone rubber is composed only of silicone rubber.

There is thus a need to provide for a method of electroless nickel plating on organsiloxane polymers, including silicone rubber, which resolves and/or ameliorates the issues mentioned above. The method provided should serve as an improved way to coat nickel and/or nickel derivatives onto neat organosiloxane polymers, including silicone rubber.

There is also a need to provide for an organosiloxane polymer composite with nickel and/or nickel derivatives coated thereon. The nickel coated organosiloxane polymer composite should at least circumvent or ameliorate one or more of the issues as mentioned above.

SUMMARY

In one aspect, there is provided for a method for coating nickel on an organosiloxane polymer comprising:
  forming a transition metal oxide on the organosiloxane polymer;
  etching the transition metal oxide with a basic solution;
  contacting the organosiloxane polymer comprising the etched transition metal oxide with an aqueous solution comprising a positively charged species to attach the positively charged species on the etched transition metal oxide;
  depositing a metal catalyst on the positively charged species; and
  treating the metal catalyst with an acidic solution to develop an activated organosiloxane polymer before transferring the activated organosiloxane polymer to a solution comprising nickel and/or nickel derivatives.

In another aspect, there is provided for a nickel organosiloxane polymer composite comprising:
  a transition metal oxide layer formed on the organosiloxane polymer; and
  a positively charged species attached on the transition metal oxide layer with nickel coated on the positively charged species.

BRIEF DESCRIPTION OF THE DRAWINGS

The drawings are not necessarily to scale, emphasis instead generally being placed upon illustrating the principles of the invention. In the following description, various embodiments of the present disclosure are described with reference to the following drawings, in which.

DETAILED DESCRIPTION

Figure 1:
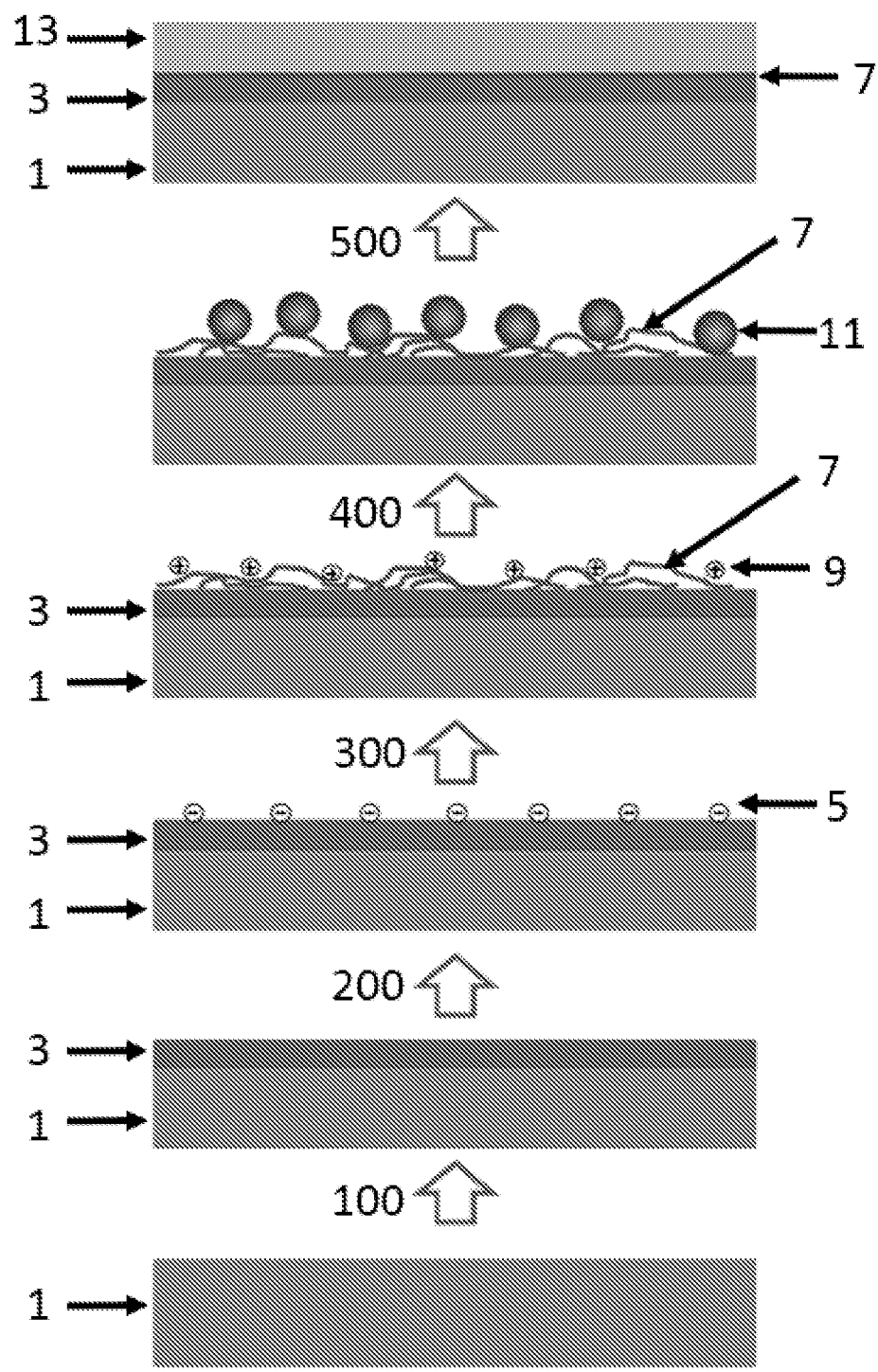
FIG. 1 shows a schematic illustration of an embodiment of the present method.

The following detailed description refers to the accompanying drawings that show, by way of illustration, specific details and embodiments in which the invention may be practised.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to a method that enables the coating of nickel onto an organosiloxane polymer (e.g. silicone rubber) by using electroless nickel plating (ENP). This generally involves modifying the organosiloxane polymer's surface so that it becomes hydrophilic and positively charged. On this modified surface, palladium (Pd) catalyst is then deposited with subsequent ENP achieved. The present disclosure also relates to a nickel organosiloxane polymer composite derived from the present method. Advantageously, the nickel organosiloxane polymer composite has improved adhesion strength of nickel plated on the organosiloxane polymer with improved plating quality.

Electroless plating is a process in which a metal layer is deposited on a substrate by chemical reduction in the absence of an external electric current. This process is advantageously energy efficient. Conventionally, platinum plating on silicone rubber and nickel plating on silicone-rich polyester have been attempted. However, these require specialized equipments, such as ultraviolet laser or argon plasma to treat the silicone rubber surface, which render such techniques economically unviable. The present method, however, uses a solution based method to modify an organosiloxane polymer (e.g. silicone rubber) surface for deposition of a catalyst for subsequent electroless nickel plating. The advantages of the present method are therefore, an easy to apply method, improved electroless nickel plating efficiency with reduced processing time of less than 30 mins, cost effectiveness, and the resultant nickel being plated in high quality.

Having outlined various advantages of the present method and the nickel organosiloxane polymer composite, definitions of certain terms are first discussed before going into details of the various embodiments.

The word "substantially" does not exclude "completely" e.g. a composition which is "substantially free" from Y may be completely free from Y. Where necessary, the word "substantially" may be omitted from the definition of the invention.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A and B" may include A or B or both A and B. Correspondingly, the phrase of the form of "at least one of A and B and C", or including further listed items, may include any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

Having defined the various terms as mentioned above, details of the various embodiments are now described below.

In the present disclosure, there is provided for a method for coating nickel on an organosiloxane polymer comprising: forming a transition metal oxide on the organosiloxane polymer, etching the transition metal oxide with a basic solution, contacting the organosiloxane polymer comprising the etched transition metal oxide with an aqueous solution comprising a positively charged species to attach the positively charged species on the etched transition metal oxide, depositing a metal catalyst on the positively charged species, and treating the metal catalyst with an acidic solution to develop an activated organosiloxane polymer before transferring the activated organosiloxane polymer to a solution comprising nickel and/or nickel derivatives.

In various embodiments, the organosiloxane polymer may be selected from the group consisting of polydimethylsiloxane, vinyl methyl polysiloxane (VMQ), phenyl methyl polysiloxane (PMQ), phenyl vinyl methyl polysiloxane (PVMQ), fluoro vinyl methyl polysiloxane (FVMQ) and derivatives of silicone rubber, wherein Q represents a quaternary silicon. In other words, the organosiloxane polymer may be selected from the group consisting of polydimethylsiloxane, vinyl methyl polysiloxane, phenyl methyl polysiloxane, phenyl vinyl methyl polysiloxane, fluoro vinyl methyl polysiloxane and derivatives of silicone rubber, wherein the polysiloxane may comprise at least one quaternary silicon. To illustrate, the silicon atoms in vinyl methyl polysiloxane may be quaternary silicon atoms.

In various embodiments, the transition metal oxide may comprise titanium oxide. In various embodiments, the transition metal oxide may be selected from the group consisting of titanium oxide, zirconium oxide, vanadium oxide, hafnium oxide, niobium oxide and tantalum oxide.

According to the present method, the forming may comprise contacting the organosiloxane polymer with a solution comprising a swelling agent and a transition metal oxide precursor for up to 30 minutes, and drying the organosiloxane polymer in ambient conditions comprising a temperature from 15° C. to 30° C. and a relative humidity from 30% to 70% to form the transition metal oxide on the organosiloxane polymer.

The transition metal oxide precursor may be used to form an intermediate layer linking the organosiloxane polymer (e.g. silicone rubber) with the subsequent transition metal oxide layer that may be formed on surface of the organosiloxane polymer. The transition metal oxide precursor may have one or more alkoxide groups that can be hydrolyzed to form a three-dimensional (3D) network. In some embodiments, the transition metal oxide precursor may have four alkoxide groups. When the organosiloxane polymer (e.g. silicone rubber) is contacted with the solution comprising the swelling agent and transition metal oxide precursor, the organosiloxane polymer may swell, i.e. the organosiloxane polymer may expand to allow diffusion of the swelling agent as well as transition metal oxide precursor into the matrix of the organosiloxane polymer. The hydrolyzation and/or gelation of the transition metal oxide precursor embedded into and/or on the organosiloxane polymer may form a transition metal oxide network that mixes or merges (interpenetrating)

with matrix of the organosiloxane polymer. The existence of such an intermediate layer in a transition metal oxide-polysiloxane interpenetrating structure advantageously enhances adhesion between the transition metal oxide layer and organosiloxane polymer. The thickness and structure of this intermediate layer may depend on time, temperature, humidity etc. For example, if the time of contact is short and humidity is low, the intermediate layer developed may be too thin to promote adhesion. Intermediate layer with high thickness, however, undesirably reduces flexibility of the organosiloxane polymer. The advantage to the duration, temperature and/or humidity range lies in the ability to form an intermediate layer with a thickness sufficient to enhance adhesion between the transition metal oxide layer and organosiloxane polymer.

In some embodiments, the organosiloxane polymer may be contacted with the solution comprising the swelling agent and the transition metal oxide precursor for up to 30 mins, up to 20 mins, up to 10 mins, up to 5 minutes etc. The longer the duration, the higher the amount of transition metal oxide that may be eventually formed on the organosiloxane polymer. The humidity (i.e. moisture in air) allows hydrolysis of the transition metal oxide precursor to form transition metal oxide on the organosiloxane polymer.

In various embodiments, the swelling agent may be selected from the group consisting of isopropyl alcohol, methanol, 2-methoxyethanol, ethanol, 1-propanol, tert-butanol and their mixtures thereof. The swelling agent may penetrate the matrix of the organosiloxane polymer so that the transition metal oxide precursor may be able to diffuse into the matrix. If the transition metal oxide precursor only absorbs on the surface of the organosiloxane polymer, poor adhesion between the subsequently formed transition metal oxide and the organosiloxane polymer may develop. The swelling agent helps in formation of an intermediate layer to enhance such an adhesion. The organosiloxane polymer may not be swellable when the solution only contains transition metal oxide precursor.

In various embodiments, the swelling agent may comprise or consist of an alcohol. The use of alcohol as the swelling agent is advantageous because it is compatible with the transition metal oxide precursor and does not compromise hydrolysis rate of the transition metal oxide precursor. The alcohol may be isopropyl alcohol. In some embodiments, the swelling agent may comprise or consist of isopropyl alcohol. Isopropyl alcohol may be preferred as it provides adequate swelling of the organosiloxane polymer and easily removed due to its low boiling point.

In various embodiments, the transition metal oxide precursor may comprise or consist of titanium isopropoxide. In some embodiments, the transition metal oxide precursor may be selected from the group consisting of titanium isopropoxide, titanium propoxide, titanium methoxide, titanium ethoxide, titanium butoxide, titanium tert-butoxide, titanium 2-ethylhexyloxide, zirconium tert-butoxide, zirconium isopropoxide, vanadium isobutoxide, vanadium oxytriethoxide, vanadium oxytriisopropoxide, vanadium oxytripropoxide, hafnium n-butoxide, hafnium tert-butoxide, niobium ethoxide, tantalum methoxide, tantalum ethoxide and tantalum butoxide.

In various embodiments, the transition metal oxide prescursor and the swelling agent may comprise a volume ratio of 1:1 to 1:99. In some instances, the volume ratio may be 1:9 (e.g. a TIP/IPA volume ratio of 10:90). In other instances, the volume ratio may be 1:3 (e.g. a TIP/IPA volume ratio of 25:75).

After forming the transition metal oxide on the organosiloxane polymer, the transition metal oxide may be etched to modify hydrophilicity of the transition metal oxide coated organosiloxane polymer (e.g. silicone rubber) such that there is an increase in surface energy. Etching at this stage of the present method advantageously removes contaminants that may be present on surface of the modified organosiloxane polymer. This also advantageously increases surface energy of the modified organosiloxane polymer and may lead to stronger absorption and/or adsorption of positively charges species that may be subsequently coated thereon. In various embodiments, the etching may occur for up to 1 min. In some embodiments, the etching may occur for at least 30 seconds or less than 30 seconds.

To carry out the etching, a basic solution may be used. The basic solution may comprise or consist of NaOH according to various embodiments. The basic solution may comprise a concentration of 0.1 to 10 M in various embodiments. In some embodiments, the basic solution may be selected from the group consisting of NaOH, KOH, LiOH and ammonia. Where NaOH is used, the NaOH may comprise or consist of a concentration of 3 M.

After etching the transition metal oxide, the organosiloxane polymer (e.g. silicone rubber) may be coated with a positively charged species such that the positively charged species attached on the etched transition metal oxide changes polarity of charges present on the etched transition metal oxide. By using a positively charged species, the negatively charged surface of the organosiloxane polymer coated with the etched transition metal oxide may be tuned to become positively charged. This advantageously improves deposition of catalyst for subsequent electroless metal plating. The positively charged species is not a surfactant. The positively charged species may carry multiple charges on each molecule of the species. When they are absorbed and/or adsorbed on the negatively charged transition metal oxide, some of the charges may be neutralized while the rest remain charged. Therefore, the charging state of the surface may be inverted from negative to positive. In comparison, a surfactant molecule tends to carry only one charge and is unable to invert the charge of the transition metal oxide layer.

In various embodiments, the positively charged species may be coated on the etched transition metal oxide by contacting the organosiloxane polymer with an aqueous solution comprising the positively charged species. In various embodiments, the aqueous solution may comprise or consist of 0.01 weight percent (wt %) to 1 wt % of the positively charged species.

In various embodiments, the positively charged species may be selected from the group consisting of positively charged nanoparticles or nanocolloids, and dendrimers comprising nitrogen. The positively charged species may also be selected from the group consisting of polymers having at least one primary amine, secondary amine, tertiary amine, pyridinyl, quaternized amine and/or quaternized pyridinyl, and their mixtures thereof. The positively charged nanoparticles or nanocolloids may comprise or consist of cetyltrimethylammonium bromide (CTAB) stabilized gold nanoparticles, spermidine stabilized silver nanoparticles, 2-(dimethylamino)ethanethiol-capped CdTe quantum dots and/or their mixtures thereof. The dendrimers may comprise or consist of polyamidoamine dendrimers, polyethylenimine dendrimers, polypropylenimine hexadecaamine dendrimers, ammonium-capped thiophosphoryl chloride dendrimers, ammonium-capped cyclotriphosphazene dendrimers and/or their mixtures thereof. The polymers may comprise or consist of polyamine, polyallylamine, polyetheramine, polyethylenimine, polyvinylpyridine, polybrene, chitosan, poly(2-(trimethylamino)ethyl methacrylate), poly(diallyldimethylammonium chloride), poly(N,N-dimethyl-3,5-dimethylene-piperidinium chloride), poly(2-vinyl-1-methylpyridinium bromide) and/or their mixtures thereof. In some embodiments, the positively charged species may be polyethylenimine.

In various embodiments, the organosiloxane polymer of the contacting step may be contacted with the aqueous solution (comprising the positively charged species) for at least 5 minutes. In other embodiments, the contacting may be 5 mins or less.

Once the positively charged species are attached on the etched transition metal oxide of the organosiloxane polymer, the catalyst for ENP may be deposited thereon. In the present method, the depositing may comprise or consist contacting the positively charged species with a solution comprising the metal catalyst for at least 5 minutes to deposit the metal catalyst on the positively charged species. In other embodiments, the duration may be 5 mins or less.

According to various embodiments, the metal catalyst may comprise or consist of, without being limited to, tin-palladium (Sn—Pd) colloidal metal catalyst. Other catalyst may be used depending on the metal to be deposited. Pd based catalyst may be used for plating other metals. Other catalysts, such as those that are copper based, may be used for plating other metals like gold, platinum etc.

In the present method, the metal catalyst (e.g. the tin-palladium colloidal metal catalyst) may be prepared by: dissolving $PdCl_2$ in an amount of 0.05 gram to 0.15 gram in 30 ml to 50 ml of HCl to form a first solution, dissolving $SnCl_2$ in 10 ml to 30 ml of HCl and subsequently adding 10 ml to 30 ml of water to form a second solution, mixing the first and second solutions, and continuously stirring the mixture (of the first and second solutions) for 10 minutes to 30 minutes, dissolving 4 gram to 5 gram of NaCl, 0.4 gram to 1.2 gram of $NaSnO_3$ and 5 gram to 15 gram of $SnCl_2$ in 40 ml to 60 ml of water to form a third solution, adding the third solution to the mixture over a duration of 20 minutes to 40 minutes, and incubating the mixture under continuous stirring for 3 hours to 5 hours at 60° C. to 70° C. The amount of each reagents used and the timing affect the quality of the Sn—Pd catalyst formed. The Sn—Pd catalyst formed under such conditions is advantageously stable with high catalytic activity, uniform in size and in the nano-scale. Otherwise, the Sn—Pd colloidal catalyst tends to aggregate during or after its formation, and/or catalytic activity may be reduced.

In some embodiments, the $SnCl_2$ for forming the second solution may be dissolved in an amount that may be at least three times the amount of $PdCl_2$ dissolved for forming the first solution. In some embodiments, the $SnCl_2$ may be dissolved in an amount of 0.5 gram to 1.5 gram.

In various embodiments, the concentration of HCl for forming the first solution and second solution may be 4 to 8 M and 9 to 12 M, respectively. In some embodiments, the concentration of HCl for forming the first solution and second solution may be 6 M and 12 M, respectively. These concentrations of HCl is advantageously useful for controlling size of the Sn—Pd nanocolloidal catalysts. Otherwise, the catalyst particle size may become undesirably large until it adversely affects their deposition on the modified organosiloxane polymer and also the catalytic activity.

Once the metal catalyst has been prepared and deposited on the positively charged species of the organosiloxane polymer, the metal catalyst may be treated with an acidic solution as mentioned above. This may activate the metal catalyst, so that the metal (e.g. nickel) can be electrolessly plated on. This treatment may be for at least 1 min or even less than 1 min. In some embodiments, the treatment with the acidic solution may be 3 mins. The acidic solution may comprise or consist of HCl. Since the outer layer of a Sn—Pd colloidal catalyst may contain $Sn^{2+}$ and/or $Cl^-$, activation using an acidic solution may be required to remove such ions to have the active Pd site(s) exposed.

Once the metal catalyst has been deposited and activated, the activated organosiloxane polymer may be transferred to a solution bath for electroless metal plating, particularly electroless nickel plating (ENP). In various embodiments, the solution may comprise nickel and/or nickel derivatives. Such a solution may be an electroless nickel plating (ENP) solution. The activated organosiloxane polymer may be contacted with the ENP solution for at least 2 minutes. In other embodiments, the contact may be 2 mins or less.

In various embodiments, the ENP solution of the present method may be prepared by mixing 4 to 6 g/l (gram/litre) of $NiSO_4$, 0.5 to 1.5 g/l of $NaH_2PO_4$, 0.5 to 1.5 g/l of oxycarboxylic acid and an amount of ammonia sufficient to maintain pH of the ENP solution between 4.5 and 5.5. The amounts for the various reagents may be determined to provide a preferred plating speed of the metal, in this instance, nickel. If concentrations happen to be too high, plating may be too fast and quality of the metal (e.g. nickel) coating may be adversely affected. The pH may be critical in the redox-reduction reaction between $Ni^{2+}$ and $H_2PO_4^-$. Otherwise, the reaction for electroless plating would not occur.

In some embodiments, the ENP solution may be prepared by mixing 4.7 g/l of $NiSO_4$, 1 g/l of $NaH_2PO_4$, 1 g/l of oxycarboxylic acid and an amount of ammonia sufficient to maintain pH of ENP solution at 4.9.

In various embodiments, the nickel derivatives may comprise or consist of nickel sulphate. The nickel derivatives may be selected from the group consisting of nickel sulphate, nickel chloride, nickel acetate, nickel nitrate and any acceptable nickel salts thereof.

In the present method, a 1-part silicone rubber or a 2-part silicone rubber may be used as the organosiloxane polymer. To prepare such silicone rubbers, the forming step of the present method may further comprise preparation of the organosiloxane polymer, the preparation comprising the steps of: blending an organosiloxane polymer precursor with a cross-linking agent to form a blended mixture and curing the blended mixture at 170° C. to 180° C. under 8 MPa to 12 MPa for at least 5 minutes, or mixing two organosiloxane polymer precursors with a curing agent and curing at 25° C. to 35° C. for 48 hours. In various embodiments, the cross-linking agent may be dicumyl peroxide. The curing agent may comprise or consist of platinum.

Between various steps of the present method, washing off residual chemicals may be required. In various embodiments, the method may further comprise rinsing the organosiloxane polymer with isopropyl alcohol before the etching and rinsing with water after each of the etching, the contacting, the depositing and the treating.

The present disclosure also provides for a nickel organosiloxane polymer composite comprising: a transition metal oxide layer formed on the organosiloxane polymer, and a positively charged species attached on the transition metal oxide layer with nickel coated on the positively charged species. The nickel organosiloxane polymer composite, derived from the present method, has a high quality of nickel plated on the organosiloxane polymer with improved adhesion of nickel to the organosiloxane polymer. Embodiments and advantages described above in relation to the present method may be applicable and/or valid to embodiments of the nickel organosiloxane polymer composite, and vice versa.

In various embodiments, the nickel organosiloxane polymer may further comprise a trace amount of Sn—Pd catalyst under the nickel coated on the positively charged species. This may help to improve adhesion of nickel to the organosiloxane polymer.

The organosiloxane polymer may be selected from the group consisting of polydimethylsiloxane, vinyl methyl polysiloxane, phenyl methyl polysiloxane, phenyl vinyl methyl polysiloxane, fluoro vinyl methyl polysiloxane and derivatives of silicone rubber, wherein the polysiloxane comprises a quaternary silicon.

In various embodiments, the transition metal oxide layer may comprise or consist of titanium oxide. In various embodiments, the transition metal oxide layer may be selected from the group consisting of titanium oxide, zirconium oxide, vanadium oxide, hafnium oxide, niobium oxide and tantalum oxide.

The positively charged species may be selected from the group consisting of positively charged nanoparticles or nanocolloids, and dendrimers comprising nitrogen. The positively charged species may also be selected from the group consisting of polymers having at least one primary amine, secondary amine, tertiary amine, pyridinyl, quaternized amine and/or quaternized pyridinyl, and their mixtures thereof. The positively charged nanoparticles or nanocolloids may comprise or consist of cetyitrimethylammonium bromide (CTAB) stabilized gold nanoparticles, spermidine stabilized silver nanoparticles, 2-(dimethylamino)ethanethiol-capped CdTe quantum dots and/or their mixtures thereof. The dendrimers may comprise or consist of polyamidoamine dendrimers, polyethylenimine dendrimers, polypropylenimine hexadecaamine dendrimers, ammonium-capped thiophosphoryl chloride dendrimers, ammonium-capped cyclotriphosphazene dendrimers and/or their mixtures thereof. The polymers may comprise or consist of polyamine, polyallylamine, polyetheramine, polyethylenimine, polyvinylpyridine, polybrene, chitosan, poly(2-(trimethylamino)ethyl methacrylate), poly(diallyldimethylammonium chloride), poly(N,N-dimethyl-3,5-dimethylenepiperidinium chloride), poly(2-vinyl-1-methylpyridinium bromide) and/or their mixtures thereof. In some embodiments, the positively charged species may be polyethylenimine.

In various embodiments, the nickel, the Sn—Pd catalyst, the positively charged species and the transition metal oxide layer may form or may comprise a thickness of 2.52 to 3 μm. The overall thickness of these layers may also depend on the various agents used and duration of each of the steps of the present method.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

EXAMPLES

The present disclosure relates to an electroless plating method to coat nickel on an organosiloxane polymer e.g. silicone rubber, polydimethylsiloxane (PDMS), vinyl methyl polysiloxane (VMQ), phenyl methyl polysiloxane (PMQ), phenyl vinyl methyl polysiloxane (PVMQ), fluoro vinyl methyl polysiloxane (FVMQ) and derivatives of silicone rubber, wherein Q represents a quaternary silicon. The latter means that the silicon atom(s) in the polysiloxane (with Q in its abbreviation) is a quaternary silicon atom(s).

The present method may include, as a non-limiting example, the following steps: sol-gel coating of titanium oxide ($TiO_2$) on silicone surface, etching of $TiO_2$ layer to increase the hydrophilicity and/or surface energy, coating of positively charged polyethylenimine, deposition of tin-palladium (Sn—Pd) colloidal catalyst, activation and electroless nickel plating (ENP). By using $TiO_2$ coating and then treatment with polyethylenimine (PEI), the silicone surface may be tuned from being inert and hydrophobic to hydrophilic and positively charged. The latter allows for deposition of Pd catalyst, which aids in electroless plating of nickel. The nickel film obtained via such steps advantageously has good continuity, high electrical conductivity and strong adhesion with the silicone.

The present method involves plating metal on silicone. The present method also involves modifying silicone surface to be hydrophilic and charged. The present method further involves depositing catalyst on silicone surface for electroless plating.

According to various non-limiting embodiments of the present method, a metallized coating on silicone rubber that may provide high electrical conductivity and good durability may be produced. The present method and nickel coated organosiloxane polymer composite are described below by way of non-limiting examples.

Example 1a

Schematic Illustration of the Present Method

The present method of ENP is schematically illustrated in FIG. 1, which includes the following steps.

In step 100, silicone rubber 1 was dipped into titanium isopropoxide-isopropyl alcohol (TIP/IPA) mixture (1-75 vol %) for about 5 minutes (mins) to coat or anchor a thin $TiO_2$ film 3 on the silicone rubber surface. This may be called a sol-gel procedure.

In step 200, the $TiO_2$ modified silicone rubber from step 100 was dipped into aqueous NaOH (0.1-10 M) for about 1 min so as to enhance hydrophilicity or increase surface energy of the $TiO_2$ film 3 by chemically etching it, and to increase its electrical potential. A negatively charged surface 5 was obtained.

In step 300, the negatively charged silicone rubber from step 200 was dipped into aqueous PEI (0.01-1 wt %) for about 10 mins to invert the sign of charge of the surface 5 by adsorption of positively charged PEI 7. A positively charged surface 9 was then obtained.

In step 400, the positively charged silicone rubber from step 300 was dipped into a Sn—Pd colloidal suspension solution for about 5 mins to deposit Pd catalyst 11.

In step 500, the catalyzed silicone rubber from step 400 was dipped into HCl solution for about 3 mins to activate the Pd catalyst 11 and nickel 13 was subsequently coated on the silicone rubber surface via ENP for about 5 mins The durations exemplified for each step disclosed in this example are non-limiting and may be shorter.

Example 1b

Nickel Plated Silicone Rubber with Shore A Hardness of 30

Silicone rubber with Shore A hardness of 30 was prepared by blending 1-part silicone (from Momentive) with dicumyl peroxide and cured at 175° C. under a pressure of 10 MPa for 6 mins. The coating was performed through the following steps:

(1) The silicone rubber was immersed in TIP/IPA solution (50:50 volume ratio) for 5 mins and then rinsed with IPA and dried in ambient air.

(2) The modified silicone rubber from (1) was immersed in 3 M NaOH solution for 1 min and then rinsed with water.

(3) The modified silicone rubber from (2) was immersed in 1 weight percent (wt %) branched PEI solution for 10 mins and then rinsed with water.

(4) The modified silicone rubber from (3) was immersed in Sn—Pd colloidal catalyst solution for 5 mins. This was followed by rinsing with water.

(5) The modified silicone rubber from (4) was immersed in 1 M HCl for 3 mins and rinsed with water, then immersed in an ENP solution at 89° C. for 5 mins with the following composition: 4.7 g/l (gram/litre) of $NiSO_4$, 1 g/l of $NaH_2PO_2$, 1 g/l of oxycarboxylic acid and a certain amount of ammonia to adjust the pH to 4.9.

The Sn—Pd catalyst of step (4) was prepared through the following steps:

(a) Dissolving 0.1 g $PdCl_2$ in 40 ml of 6 M HCl under magnetic stirring.

(b) Adding 1 g $SnCl_2$ into 20 ml of 12 M HCl. After complete dissolution, 20 ml of water was added to the solution of (b) to become more diluted.

(c) Solution of (b) was then added to solution of (a) under continuous stirring for 20 mins.

(d) 4.4 g of NaCl, 0.8 g of $NaSnO_3$ and 10 g of $SnCl_2$ were dissolved in 50 ml water. Subsequently, solution of (d) was added slowly to solution of (c) for 30 mins.

(e) The mixture from (d) was kept in a water bath at 65° C. for 4 hours under stirring.

Example 1c

Nickel Plated Silicone Rubber with Shore A Hardness of 70

Silicone rubber with Shore A hardness of 70 was prepared by blending 1-part silicone (from Momentive) with dicumyl peroxide and cured at 175° C. under 10 MPa for 6 mins. The coating was performed through the following steps:

(1) The silicone rubber was immersed in TIP/IPA solution (50:50) for 5 mins and then rinsed with IPA and dried in ambient air.

(2) The modified silicone rubber from (1) was immersed in 3 M NaOH solution for 1 min and then rinsed with water.

(3) The modified silicone rubber from (2) was immersed in 1 wt % branched PEI solution for 10 mins and then rinsed with water.

(4) The modified silicone rubber from (3) was immersed in Sn—Pd colloidal catalyst solution for 5 mins, followed by rinsing with water.

(5) The modified silicone rubber from (4) was immersed in 1 M HCl for 3 mins and rinsed with water, and then immersed in an ENP solution at 89° C. for 5 mins with the following composition: 4.7 g/l of $NiSO_4$, 1 g/l of $NaH_2PO_2$, 1 g/l of oxycarboxylic acid and a certain amount of ammonia to adjust the pH to 4.9.

The Sn—Pd catalyst of step (4) was prepared through the following steps:

(a) 0.1 g $PdCl_2$ was dissolved in 40 ml of 6 M HCl under magnetic stirring.

(b). 1.0 g $SnCl_2$ was added into 20 ml of 12 M HCl. After complete dissolution, 20 ml water was added to the solution.

(c) Solution of (b) was added into solution of (a) under continuous stirring for 20 mins.

(d) 4.4 g of NaCl, 0.8 g of $NaSnO_3$ and 10 g of $SnCl_2$ were dissolved in 50 ml water. Subsequently, solution of (d) was added slowly into solution of (c) for 30 mins.

(e) The mixture from (d) was kept in a water bath at 65° C. for 4 hours under stirring.

Example 1d

Nickel Plated Silicone Rubber with Shore A Hardness of 43

Silicone rubber with Shore A hardness of 43 was prepared from 2-parts silicone (Sylgard 184). The 2-parts silicones comprise platinum (Pt) curing agent which was first blended and then cured at room temperature for 48 hours. The coating was performed through the following steps:

(1) The 2-parts silicone rubber was immersed in TIP/IPA (50:50) solution for 5 mins and then rinsed with IPA and dried in ambient air.

(2) The modified silicone rubber from (1) was immersed in 3 M NaOH solution for 1 min and then rinsed with water.

(3) The modified silicone rubber from (2) was immersed in 1 wt % branched PEI solution for 10 mins and then rinsed with water.

(4) The modified silicone rubber from (3) was immersed in Sn—Pd colloidal catalyst for 5 mins, followed by rinsing with water.

(5) The modified silicone rubber from (4) was immersed in 1 M HCl for 3 mins and rinsed with water, and then immersed in an ENP solution at 89° C. for 5 mins with the following composition: 4.7 g/l of $NiSO_4$, 1 g/l of $NaH_2PO_2$, 1 g/l of oxycarboxylic acid and a certain amount of ammonia to adjust the pH to 4.9.

The Sn—Pd catalyst of step (4) was prepared through the following steps:

(a) 0.1 g $PdCl_2$ was dissolved in 40 ml of 6 M HCl under magnetic stirring.

(b) 1.0 g $SnCl_2$ was added into 20 ml of 12 M HCl. After complete dissolution, 20 mL water was added to the solution.

(c) Solution of (b) was added into solution of (a) under continuous stirring for 20 mins (d) 4.4 g of NaCl, 0.8 g of $NaSnO_3$ and 10 g of $SnCl_2$ were dissolved in 50 ml water. Subsequently, solution of (d) was added slowly into solution of (c) for 30 mins.

(e) The mixture from (d) was kept in a water bath at 65° C. for 4 hours under stirring.

Comparative Example 1a

Present Method Without $TiO_2$ Coating

Silicone rubber with Shore A hardness of 30 was prepared by blending 1-part silicone (from Momentive) with dicumyl peroxide and cured at 175° C. under 10 MPa for 6 mins. The coating was performed through the following steps:

(1) The silicone rubber was immersed in 3 M NaOH solution for 1 min and then rinsed with water.

(2) The modified silicone rubber from (1) was immersed in 1 wt % branched PEI solution for 10 mins and then rinsed with water.

(3) The modified silicone rubber from (2) was immersed in Sn—Pd colloidal catalyst for 5 mins, followed by rinsing with water.

(4) The modified silicone rubber from (3) was immersed in 1 M HCl for 3 mins and rinsed with water, and then immersed in an ENP solution at 89° C. for 5 mins with the following composition: 4.7 g/l of $NiSO_4$; 1 g/l of $NaH_2PO_2$, 1 g/l of oxycarboxylic acid and a certain amount of ammonia to adjust the pH to 4.9.

The Sn—Pd catalyst of step (3) was prepared through the following steps:

(a) 0.1 g $PdCl_2$ was dissolved in 40 ml of 6 M HCl under magnetic stirring.

(b) 1.0 g $SnCl_2$ was added into 20 ml of 12 M HCl. After complete dissolution, 20 ml water was added to the solution.

(c) Solution of (b) was added into solution of (a) under continuous stirring for 20 mins.

(d) 4.4 g of NaCl, 0.8 g of $NaSnO_3$ and 10 g of $SnCl_2$ were dissolved in 50 ml water. Subsequently, solution of (d) was added slowly into solution of (c) for 30 mins (e) The mixture from (d) was kept in a water bath at 65° C. for 4 hours under stirring.

Comparative Example 1b

Present Method Without NaOH Etching

Silicone rubber with Shore A hardness of 30 was prepared from by blending 1-part silicone (from Momentive) with dicumyl peroxide and cured at 175° C. under 10 MPa for 6 mins. The coating is performed through the following steps:

(1) The silicone rubber was immersed in TIP/IPA solution (50:50) for 5 mins and then rinsed with IPA and dried in ambient air.

(2) The modified silicone rubber from (1) was immersed in 1 wt % branched polyethylenimine (PEI) solution for 10 min, then rinsed with water.

(3) The modified silicone rubber from (2) was immersed in Sn—Pd colloidal catalyst for 5 mins, followed by rinsing with water.

(4) The modified silicone rubber from (3) was immersed in 1 M HCl for 3 mins and rinsed with water, and then immersed in an ENP solution at 89° C. for 5 mins with the following composition: 4.7 g/l of $NiSO_4$, 1 g/l of $NaH_2PO_2$, 1 g/l of oxycarboxylic acid and a certain amount of ammonia to adjust the pH to 4.9.

The Sn—Pd catalyst of step (3) was prepared through the following steps:

(a) 0.1 g $PdCl_2$ was dissolved in 40 ml of 6 M HCl under magnetic stirring.

(b) 1.0 g $SnCl_2$ was added into 20 ml of 12 M HCl. After complete dissolution, 20 ml water was added to the solution.

(c) Solution of (b) was added into solution of (a) under continuous stirring for 20 mins.

(d) 4.4 g of NaCl, 0.8 g of $NaSnO_3$ and 10 g of $SnCl_2$ were dissolved in 50 ml water. Subsequently, solution of (d) was added slowly into solution of (c) for 30 mins.

(e) The mixture from (d) was kept in a water bath at 65° C. for 4 hours under stirring.

Comparative Example 1c

Present Method Without PEI Coating

Silicone rubber with Shore A hardness of 30 was prepared by blending 1-part silicone (from Momentive) with dicumyl peroxide and cured at 175° C. under 10 MPa for 6 mins. The coating was performed through the following steps:

(1) The silicone rubber was immersed in TIP/IPA solution (50:50) for 5 mins and then rinsed by IPA and dried in ambient air.

(2) The modified silicone rubber from (1) was immersed in 3 M NaOH solution for 1 min and then rinsed with water.

(3) The modified silicone rubber from (2) was immersed in Sn—Pd colloidal catalyst for 5 mins, followed by rinsing with water.

(4) The modified silicone rubber from (3) was immersed in 1 M HCl for 3 mins and rinsed with water, and then immersed in an ENP solution at 89° C. for 5 mins with the following composition: 4.7 g/l of $NiSO_4$, 1 g/l of $NaH_2PO_2$, 1 g/l of oxycarboxylic acid and a certain amount of ammonia to adjust the pH to 4.9.

The Sn—Pd catalyst of step (3) was prepared through the following steps:

(a) 0.1 g $PdCl_2$ was dissolved in 40 ml of 6 M HCl under magnetic stirring.

(b) 1.0 g $SnCl_2$ was added into 20 ml of 12 M HCl. After complete dissolution, 20 ml water was added to the solution.

(c) Solution of (b) was added into solution of (a) under continuous stirring for 20 mins.

(d) 4.4 g of NaCl, 0.8 g of $NaSnO_3$ and 10 g of $SnCl_2$ were dissolved in 50 ml water. Subsequently, solution of (d) was added slowly into solution of (c) for 30 mins.

(e) The mixture from (d) was kept in a water bath at 65° C. for 4 hours under stirring.

Example 2

Characterization and Results

The resultant nickel plated silicone rubber derived from the present method was characterized and the results are discussed as follow.

Figure 2:
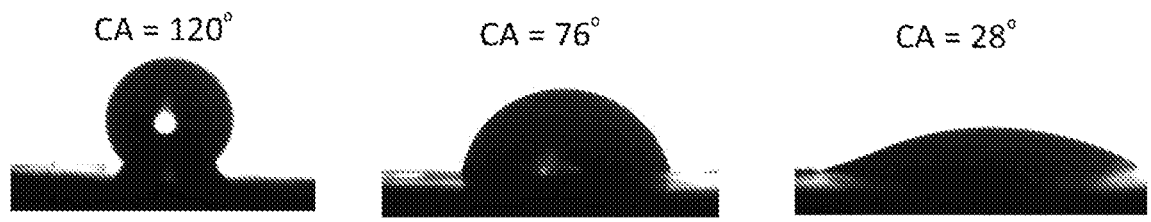
FIG. 2 shows the contact angle (CA) of water droplet on various silicone rubber surfaces.

FIG. 2 shows the water contact angles of neat and $TiO_2$ coated silicone rubber at 120° and 76°, respectively. With $TiO_2$ coating and subsequent NaOH etching, the silicone rubber becomes even more hydrophilic with higher surface energy, having a water contact angle of 28°.

Figure 3:
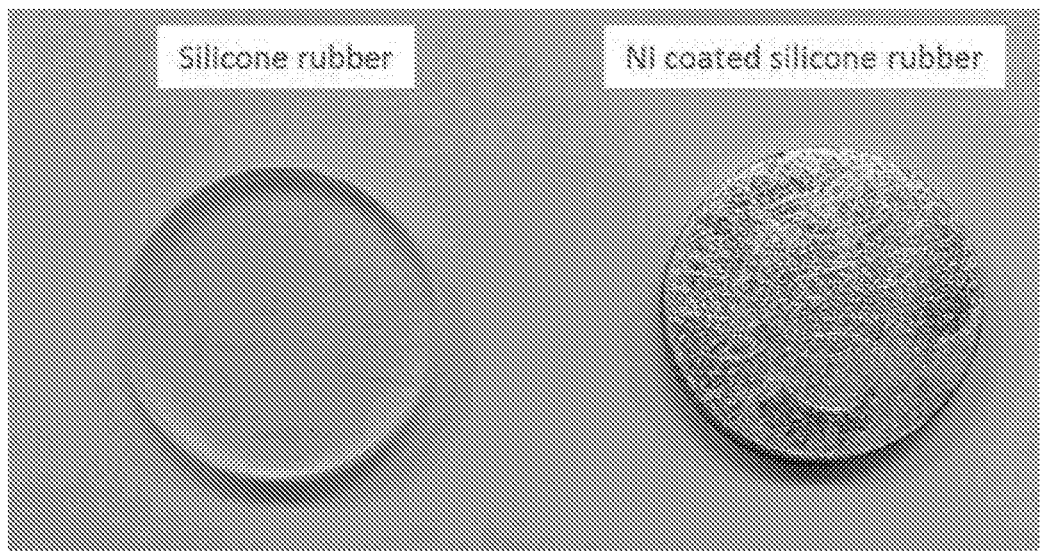
FIG. 3 shows photos of untreated silicone rubber and silicone rubber that has undergone electroless nickel plating according to embodiments of the present method.

FIG. 3 shows a photo of nickel plated silicone rubber from example 1b where the metallic coating is uniform and fully covers the silicone rubber surface.

Figure 4:
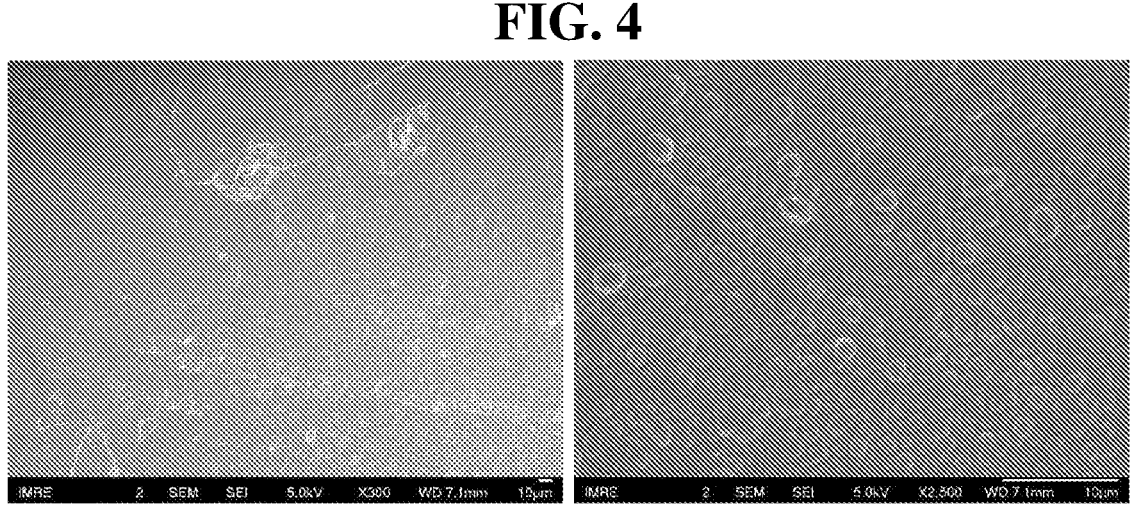
FIG. 4 shows scanning electron microscopy (SEM) images of a nickel plated silicone rubber derived from an embodiment of the present method. The scale bar in both images represent 10 µm. The difference between the left and right SEM images lies in their magnification. The left SEM image has a magnification of ×300 while the right SEM image has a magnification of ×2500.

FIG. 4 shows the scanning electron microscopy (SEM) images of the nickel plated silicone rubber from example 1b. The difference between the left and right SEM images lies in their magnification, the left image having a magnification of ×300 while the right image has a magnification of ×2500. The plated nickel layer has high continuity, conductivity, smoothness and adhesion to silicone rubber.

The surface conductivity of the nickel plated samples was measured by 4-probe resistivity meter (Mitsubishi Chemical Analytech MCP-T370). The thickness was estimated by the weight of the deposited nickel layer. Adhesion strength between the coating and substrate was determined by using the pull out adhesion test (DeFelsko PosiTest AT-A) in accordance with ASTM D 4541. All the data are listed in table 1 below.

TABLE 1

Properties of Nickel Plated Silicone Rubber.

| | Nickel Deposition | Nickel Coating Thickness (μm) | Surface Resistivity (Ω/sq) | Adhesion Strength (MPa) |
|---|---|---|---|---|
| Example 1b | Yes | 2.5 | 1.3 | 0.48 |
| Example 1c | Yes | 2.8 | 0.8 | 0.79 |
| Example 1d | Yes | 3.0 | 1.2 | 0.90 |
| Comparative Example 1a | No | — | — | — |
| Comparative Example 1b | Yes | 1.4 | 26.3 | 0.31 |
| Comparative Example 1c | No | — | — | — |

Example 3

Modification of Silicone Rubber Surface

The structure of TIP is shown below.

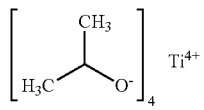

TIP can be hydrolyzed by water and this is depicted by the equation below.

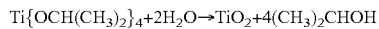

Figure 5:
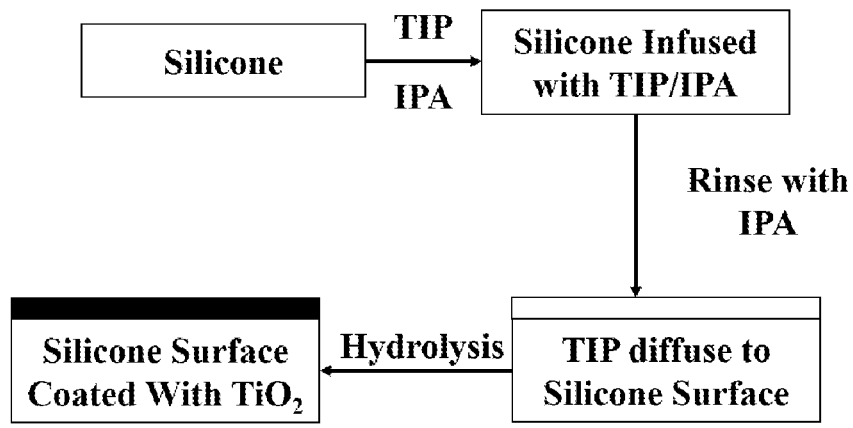
FIG. 5 shows a schematic diagram of coating silicone with $TiO_2$ using titanium isopropoxide (TIP) and isopropyl alcohol (IPA) according to an embodiment disclosed herein.

As the hydrolysis of TIP is fast, TIP is prepared in the form of TIP/IPA solution before used. Silicone rubber is then immersed into the TIP/IPA solution. The silicone rubber will be swelled by the IPA and this allows the TIP molecules to enter the silicone rubber matrix. Subsequently, the silicone rubber is removed from the solution and rinsed with IPA. The TIP inside the silicone rubber matrix then diffuses to the surface and may be hydrolyzed by moisture in the air to form crosslinked $TiO_2$ on the surface of the silicone rubber. This process is shown in FIG. 5.

Apart from using IPA as the swelling agent, other feasible swelling agents may include methanol, 2-methoxyethanol, ethanol, 1-propanol, tert-butanol and/or their mixtures thereof. Apart from coating $TiO_2$, other transition metal oxide such as zirconium oxide, vanadium oxide, hafnium oxide, niobium oxide or tantalum oxide may be used. This implies other than TIP as the transition metal oxide precursor, other transition metal oxide precursor such as titanium propoxide, titanium methoxide, titanium ethoxide, titanium butoxide, titanium tert-butoxide, titanium 2-ethylhexyloxide, zirconium tert-butoxide, zirconium isopropoxide, vanadium isobutoxide, vanadium oxytriethoxide, vanadium oxytriisopropoxide, vanadium oxytripropoxide, hafnium n-butoxide, hafnium tert-butoxide, niobium ethoxide, tantalum methoxide, tantalum ethoxide or tantalum butoxide may be used.

Table 2 below shows how some properties of $TiO_2$ coated silicone rubber may be affected by duration of immersion in TIP/IPA.

TABLE 2

Immersion of Silicone Rubber in TIP/IPA Solution (50/50) for Various Duration before Rinsing with IPA and Drying in Air

| Time (mins) | Shore A Hardness | $TiO_2$ Thickness (μm) | Water Contact Angle (°) |
|---|---|---|---|
| 0 | 38 | 0 | 120 |
| 1 | 43 | 12 | 85 |
| 2 | 45 | 19 | 81 |
| 5 | 49 | 22 | 76 |
| 10 | 52 | 28 | 74 |
| 20 | 54 | 33 | 80 |

As observed from table 2, the hardness of silicone rubber increased with more $TiO_2$ coating. In other words, when the duration of immersion in TIP/IPA becomes longer, the amount of $TiO_2$ hydrolyzed or coated on the silicone surface increases and the hardness of the modified silicone becomes higher. Based on this, the duration of immersion may be considered for limiting to 5 mins or less to minimize or avoid too high a hardness while yielding a silicone fully coated with $TiO_2$. The effect of TIP concentration was also studied, using a silicone rubber with Shore A hardness of 30. The results are shown in table 3 below.

TABLE 3

Comparison of TIP Concentration

| Time (mins) | TIP:IPA Concentration Ratio | Shore A Hardness | Thickness (μm) | Water Contact Angle (°) |
|---|---|---|---|---|
| 5 | 25:75 | 35 | 5.1 | 82 |
|   | 10:90 | 32 | 2.6 | 85 |

As seen from table 3, thickness of $TiO_2$ decreased when concentration of TIP was lowered. This also resulted in lowering of hardness. Meanwhile, table 4 below demonstrates the effect of duration of immersion at different concentration of TIP. The concentration ratio is based on volume of the reagents and hence may be referred to as a volume ratio as well.

TABLE 4

Effect of Immersion Duration at Different TIP Concentration

| TIP:IPA Concentration Ratio | Time | Shore A Hardness | Thickness (μm) | Water Contact Angle (°) |
|---|---|---|---|---|
| 25:75 | 30 seconds | 31 | 0.9 | 88 |
|  | 1 min | 33 | 1.6 | 78 |
|  | 2 mins | 34 | 3.7 | 77 |
| 10:90 | 30 seconds | 30 | 0.7 | 95 |
|  | 1 min | 30-31 | 1.3 | 84 |
|  | 2 mins | 30-31 | 1.5 | 81 |

Example 4

Modifying Hydrophilicity of $TiO_2$ Coated Silicone Rubber

Neat silicone rubber has a water contact angle of 120° while $TiO_2$ modified silicone rubber may have a water contact angle in the range of about 75° to 85°. The decrease in water contact angle signifies that coating of silicone rubber with the transition metal oxide, $TiO_2$, is successful.

However, the water contact angle of $TiO_2$ coated silicone rubber is still considered high and not very hydrophilic. It is postulated that this may be because of adsorption of organic molecules on $TiO_2$. While the hydrophilicity of $TiO_2$ can be tuned using ultraviolet radiation, a chemical method is used in the present disclosure instead.

This chemical method relies on using a basic solution to etch the transition metal oxide, e.g. $TiO_2$. The basic solution may include NaOH, KOH, LiOH, ammonia etc. An example of using NaOH is represented in the equation below.

$$TiO_2 + 2NaOH \rightarrow Na_2TiO_3 + H_2O$$

As a non-limiting example, this is carried out by immersing the $TiO_2$ coated silicone rubber into 3 M NaOH. After 1 min, the water contact angle was measured, dropping from 74° to 28°. This demonstrates such a chemical method is advantageous for enhancing hydrophilicity of the silicone rubber such that the surface energy of the silicone rubber is increased.

Example 5

Modification of Etched $TiO_2$ Silicone Rubber

It was presumed that after etching the $TiO_2$ silicone rubber, the latter would have been ready for ENP. To this end, the preparation of a Sn—Pd colloidal solution was carried out as follows.

(1) Dissolution of 0.1 $PdCl_2$ in 40 ml 50% HCl (HCl:water in 50:50 ratio). The 50% HCl and HCl:water ratio are derived on a volume basis.

(2) 1.0 g of $SnCl_2$ was added into 20 ml concentrated HCl (37%). After complete dissolution, 20 ml water was added.

(3) Solution of (2) was added to solution of (1) under stirring. The mixture turned from red to a darker colour under continuous stirring for 20 mins.

(4) 4.4 g of NaCl, 0.8 g of $NaSnO_3$ and 10 g of $SnCl_2$ were dissolved in 50 ml water. Subsequently, solution of (4) was added slowly into solution of (3) for 30 mins.

(e) The mixture from (4) was kept in a water bath at 65° C. for 4 hours under stirring.

Figure 6:
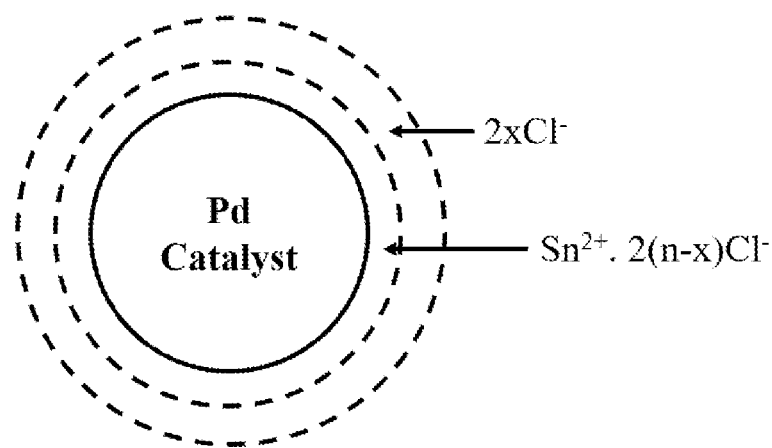
FIG. 6 shows the negatively charged structure of a tin-palladium (Sn—Pd) colloidal catalyst.
Figure 7:
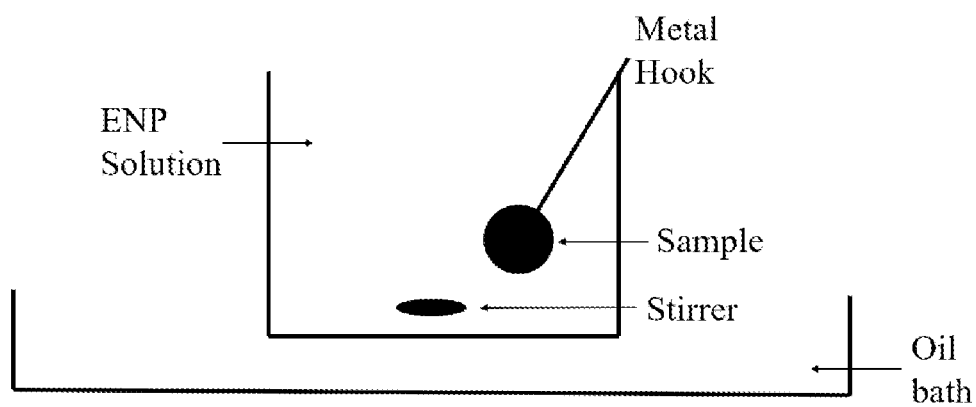
FIG. 7 shows a typical setup of electroless nickel plating (ENP) bath.

It was observed that the resultant Sn—Pd colloidal catalyst (in solution) has a darker colour with no precipitate at bottom. Meanwhile, the composition of an ENP solution was prepared as follows: 4.7 g/l of $NiSO_4$, 1 g/l of $NaH_2PO_2$, 1 g/l of oxycarboxylic acid and a certain amount of ammonia to adjust the pH to 4.9. The ENP solution was green in colour. The etched $TiO_2$ silicone rubber was then immersed in the Sn—Pd catalyst solution for 5 mins. It was then removed and rinsed with water, followed by contacting with 1 M HCl for 3 mins to activate the catalyst. Subsequently, the catalyst coated silicone rubber was immersed in the ENP solution for nickel electroless plating. The ENP bath was at 88° C. to 90° C. However, few bubbles were observed on the silicone rubber surface and no reaction occurred. Even after some time, the silicone rubber floated to the surface, signifying that it has turned hydrophobic, losing its earlier hydrophilicity. This showed that ENP was unsuccessful. It was then concluded that it was the Sn—Pd catalyst deposition that was not successful because bubbles were actually generated from the metal pin used to load the samples into the ENP bath (see setup in FIG. 7). It was then attributed that both $TiO_2$ and Sn—Pd colloidal catalyst being negatively charged (even though both are hydrophilic and possess polar groups), resulted in electrostatic repulsion leading to unsuccessful deposition of catalyst. A negatively charged Sn—Pd catalyst is shown in FIG. 6. To resolve this, the etched $TiO_2$ silicone rubber surface has to be modified to be positively charged and branched PEI (from Sigma 408727, Mw about 25,000, Mn about 10,000) was used. Other than PEI, positively charged species such as positively charged nanoparticles or nanocolloids, dendrimers comprising nitrogen and/or their mixtures thereof may be used. Polymers having at least one primary amine, secondary amine, tertiary amine, pyridinyl, quaternized amine and/or quaternized pyridinyl and/or their mixtures thereof may also be used.

The procedure was therefore changed to immersing the etched $TiO_2$ silicone rubber in 1 wt % PEI solution for 10 mins before contacting the PEI coated silicone rubber with Sn—Pd colloidal catalyst solution, HCl activation solution and the ENP bath which have been described above. The setup of FIG. 7 was used and successful ENP was observed. After PEI treatment and dipping in the Sn—Pd solution, the Sn—Pd deposition can be observed by the naked eye as a film red in colour on the silicone rubber was deposited and this red film was not removed when rinsed with water. As for the ENP stage, after immersing the sample into the ENP bath, vigorous bubbling from the sample surface was observed which turned darker promptly first and then became white grey due to colour of nickel deposited. A summary of the characterized nickel plated silicone rubber are tabulated in table 5 below. These samples were derived with immersion duration of 5 mins in TIP/IPA (50:50 volume ratio).

TABLE 5

Characterized Results Summary of Various Samples

| Shore A Hardness | Silicone Sample | Conductivity (Ω/sq) | Adhesion Strength (MPa) | Coating Thickness (μm) |
|---|---|---|---|---|
| 30 | From Momentive 26030 | 1.3 | 0.48 | 2.5 |
| 70 | From Momentive 22870 | 0.8 | 0.79 | 2.8 |
| 43 | Dow Corning Slygard 184 | 1.2 | 0.9 | 3 |

The electrical conductivity of the present nickel plated silicone rubber may be further improved by, for example, incorporating metal coated glass beads (about up to 80 wt %), Cu or Ag nanowires, or carbon nanoparticles, into a 2-parts silicone rubber. It can also be improved with metallic coating (conductive silicone oil with peroxide, further electroplating etc.) of a 2-parts silicone rubber.

The thermal conductivity of the present nickel plated silicone rubber may be further improved by, for example, incorporating silicon carbide or boron nitride, into a 2-parts silicone rubber.

Example 6

Potential and Commercial Applications

Application of nickel plated organosiloxane polymers derived through the present method can include EMI shielding/gasket, flexible electrodes, soft actuators, microfluidic devices etc.

A comparison of a nickel plated silicone rubber derived via the present method with current industrial products is shown in table 6 below.

TABLE 6

Comparison of Present Sample with Current Industrial Products

| | Nickel Plated Silicone Rubber of Present Method | Holland Shielding Systems 5750 (Industrial Product) | EMI Conductive Rubber ECR-213 (Industrial Product) | Holland Shielding Systems 5770 (Industrial Product) |
|---|---|---|---|---|
| Material | Nickel plated silicone rubber | Conductive silicone filled with Ag/Cu | Conductive silicone filled with nickel/graphite | Nickel plated polyurethane foam |
| Shore A Hardness | 32 | 78 | 60 | Less than 10 |
| Density (g/cm$^3$) | 1.1 | 3.5 | 1.9 | Less than 0.1 |
| Resistivity ($\Omega$ cm) | 0.0003 | 0.002 | 0.1 | 0.02 |
| Working Temperature (° C.) | −60 to 220 | −60 to 220 | −60 to 220 | −45 to 85 |

Clearly, table 6 demonstrates that the present nickel plated silicone rubber, and the present method, are advantageous over current industrial products. It should be noted that lower hardness yields better sealing performance when the silicone rubber is used for gasket applications while conductive silicone rubber with Shore A hardness below 40 is in higher demand by the industry. The present nickel plated silicone rubber can also be developed into a conductive foam.

Apart from using silicone rubber as an example, the present method can be used to plate nickel on other organosiloxane polymers. One such example is PDMS. PDMS is a type of soft mold used in nanoimprinting. Its advantages include easy to replicate surface structures, low cost and ease of demolding. Accordingly, one potential application of the present method is to imprint metal coated nanostructures using nickel plated PDMS mold. For implantation, the PDMS mold may be first plated with nickel and then used to imprint patterns (e.g. photoresist). This is because PDMS has a relatively lower surface energy than the pattern-imprinted material, after demolding, the metal (e.g. nickel) may be transferred to the material, resulting in a metallized pattern. Unlike e-beam evaporation, the metallized pattern made via the present method can be in any shape and has a continuous metallic surface.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for coating nickel on an organosiloxane polymer comprising:
    forming a transition metal oxide on the organosiloxane polymer;
    etching the transition metal oxide with a basic solution;
    contacting the organosiloxane polymer comprising the etched transition metal oxide with an aqueous solution comprising a positively charged species to attach the positively charged species on the etched transition metal oxide;
    depositing a metal catalyst on the positively charged species; and
    treating the metal catalyst with an acidic solution to develop an activated organosiloxane polymer before transferring the activated organosiloxane polymer to a solution comprising nickel and/or nickel derivatives.

2. The method according to claim 1, wherein the organosiloxane polymer is selected from the group consisting of polydimethylsiloxane, vinyl methyl polysiloxane, phenyl methyl polysiloxane, phenyl vinyl methyl polysiloxane, fluoro vinyl methyl polysiloxane, and derivatives of silicone rubber, wherein the polysiloxane comprises at least one quaternary silicon.

3. The method according to claim 1, wherein the transition metal oxide comprises titanium oxide.

4. The method according to claim 1, wherein the forming comprises contacting the organosiloxane polymer with a solution comprising a swelling agent and a transition metal oxide precursor for up to 30 minutes, and drying the organosiloxane polymer in ambient conditions comprising a temperature from 15° C. to 30° C. and a relative humidity from 30% to 70% to form the transition metal oxide on the organosiloxane polymer.

5. The method according to claim 4, wherein the swelling agent comprises isopropyl alcohol.

6. The method according to claim 4, wherein the transition metal oxide precursor comprises titanium isopropoxide.

7. The method according to claim 4, wherein the transition metal oxide precursor and the swelling agent comprise a volume ratio of 1:1 to 1:99.

8. The method according to claim 1, wherein the positively charged species attached on the etched transition metal oxide changes polarity of charges present on the etched transition metal oxide.

9. The method according to claim 8, wherein the positively charged species is selected from the group consisting of positively charged nanoparticles or nanocolloids, dendrimers comprising nitrogen, polymers having at least one primary amine, secondary amine, tertiary amine, pyridinyl, quaternized amine, quaternized pyridinyl, and their mixtures thereof.

10. The method according to claim 1, wherein the metal catalyst comprises tin-palladium (Sn—Pd) colloidal metal catalyst.

11. The method according to claim 10, wherein the tin-palladium colloidal metal catalyst is prepared by:
    dissolving PdCl2 in an amount of 0.05 gram to 0.15 gram in 30 ml to 50 ml of HCl to form a first solution;
    dissolving SnCl2 in 10 ml to 30 ml of HCl and subsequently adding 10 ml to 30 ml of water to form a second solution;
    mixing the first and second solutions, and continuously stirring the mixture for 10 minutes to 30 minutes;
    dissolving 4 gram to 5 gram of NaCl, 0.4 gram to 1.2 gram of NaSnO3 and 5 gram to 15 gram of SnCl2 in 40 ml to 60 ml of water to form a third solution;
    adding the third solution to the mixture over a duration of 20 minutes to 40 minutes; and
    incubating the mixture under continuous stirring for 3 hours to 5 hours at 60° C. to 70° C.

12. The method according to claim 11, wherein concentration of the HCl forming the first solution and the second solution is 4 to 8 M and 9 to 12 M, respectively.

13. The method according to claim 1, wherein the solution comprising nickel and/or nickel derivatives is prepared by mixing 4 to 6 g/l of NiSO4, 0.5 to 1.5 g/l of NaH2PO4, 0.5 to 1.5 g/l of oxycarboxylic acid, and an amount of ammonia sufficient to maintain pH of the ENP solution between 4.5 and 5.5.

14. The method according to claim 1, wherein the forming further comprises preparing the organosiloxane polymer, wherein the preparing comprises:
   blending an organosiloxane polymer precursor with a cross-linking agent to form a blended mixture and curing the blended mixture at 170° C. to 180° C. under 8 MPa to 12 MPa for at least 5 minutes; or
   mixing two organosiloxane polymer precursors with a curing agent and curing at 25° C. to 35° C. for 48 hours.

* * * * *